United States Patent [19]

Meynier

[11] Patent Number: 5,135,072
[45] Date of Patent: Aug. 4, 1992

[54] VIBRATING SEISMIC SOURCE USABLE NOTABLY IN WELLS

[75] Inventor: Patrick Meynier, Chatou, France

[73] Assignee: Institut Francais du Petrole, Rueil-Malmaison, France

[21] Appl. No.: 630,188

[22] Filed: Dec. 19, 1990

[30] Foreign Application Priority Data

Dec. 19, 1989 [FR] France .................... 89 16946

[51] Int. Cl.⁵ ............................................. G01V 1/40
[52] U.S. Cl. ................................. 181/106; 181/121; 367/75
[58] Field of Search .............. 181/106, 121, 113, 105; 367/912, 189, 75; 73/151, 152

[56] References Cited

U.S. PATENT DOCUMENTS

| | | | |
|---|---|---|---|
| 3,195,659 | 7/1965 | Goodman | 175/55 |
| 3,999,626 | 12/1976 | Adams | 181/121 |
| 4,853,906 | 8/1989 | Cole | 181/121 |
| 4,907,670 | 3/1990 | Anstey | 181/121 |

*Primary Examiner*—J. W. Eldred
*Attorney, Agent, or Firm*—Antonelli, Terry, Stout & Kraus

[57] ABSTRACT

A seismic source for emitting vibrations through rotation of a set of eccentric weights. Two pairs of angularly out-of-phase weights (A1, A2 and C1, C2) rotate in the same direction. One pair of weight (B1, B2) of twice the mass of each of the first pairs of weights (A1, A2 or C1, C2), also angularly out of phase in relation to one another, rotates in the direction opposite to that of the first pairs of weights and at the same speed. All the weights are rotated by electric motors. An electronic set (ME1, ME2) receives control signals (cp1-cp6 and ac1-ac3) representative at any moment of the position of all the weights and out of direction of the generated resulting vibration, and produces electric currents (IMA1-IMA6) driving the motors, as well as currents (ICH, EV) necessary for controlling a hydraulic plant to secure the source against an application wall. The electronic set automatically controls the vibration in order to obtain the desired oscillation direction, frequency and intensity. The seismic source can be used in seismic prospecting in wells.

15 Claims, 3 Drawing Sheets

FIG.3

VIBRATING SEISMIC SOURCE USABLE NOTABLY IN WELLS

BACKGROUND OF THE INVENTION

The present invention relates to a vibrating source, and particularly to a source adapted to be lowered into a relatively narrow well.

The vibrating source according to the invention can advantageously be used for the purposes of seismic prospecting, in order to explore subterranean zones likely to include hydrocarbon reserves. Seismic signals are emitted in the ground, and signals reflected by the subterranean reflectors are received by means of pickups. The received signals are recorded, and the recordings are subjected to systematic clarification treatments in order to obtain seismic sections that are accurately representative of the subsoil configuration.

Seismic prospecting can be achieved for example, by means of a vibrating source comprising a transmitting element which is in contact with the ground or the wall of a well, and means for applying sinusoidal forces to the transmitting element. The vibrations are emitted during a certain time interval, followed by a listening time interval during which the reflected waves are received. The frequency of the emitted waves can be constant, but frequency excursions can also be utilized.

To generate vibrations in the ground, vibrators of the piezoelectric or magnetostrictive type, or hydraulic or pneumatic electromagnetic vibrators are used. Different vibrators are described for example in U.S. Pat. Nos. 4,805,727, 4,774,427, 4,715,470 or 3,718,205.

French Patents 1,542,973, 1,428,395, 1,295,059 or U.S. Pat. No. 4,234,053 also notably describe vibrating sources where the motor means comprise one or several eccentric turning parts the rotation axes of which are rigidly linked to transmitting elements coupled with the ground. The developed force increases with the mass of the turning parts and with their rotation speed. Only one turning part is necessary to obtain a turning force. In order to obtain a vibrational force following a particular polarization direction, a couple made up of two parts that are rotated at an identical speed but in opposite directions, symmetrically in relation to the chosen direction, is set up. The drawback of this type of source is that the vibrational force increases with the rotation speed, therefore with the frequency of the generated vibrations. A well-known method for regulating the force consists of utilizing two couples made up of turning parts with the same rotation speed, while introducing between them an angular phase shift that is varied according to the frequency of the vibrations to be generated. However, generally speaking, angular phase shifts are obtained by mechanical means such as pinions and gears, which complicates the apparatus. Perfectly controlling the amplitude of the generated vibrational force according to the frequency is difficult to do with this type of purely mechanical compensator. Besides, it should also be noted that:

vibrators with eccentrics are generally quite bulky; they are designed for working at the surface and are not adapted for working in wells or wellbores that are most often very narrow; and the mechanical compensators used to regulate the vibrational force according to the frequency contribute to increasing further on the volume of vibrators with eccentrics and lend themselves poorly to remote controlling.

SUMMARY OF THE INVENTION

The vibrating source according to the present invention avoids the drawbacks cited above. It comprises an extended body, a multifunction cable fitted with electric conductors for linking the body to a remote installation, and means for creating vibrations through the controlled rotation of eccentric parts, and is characterized by a combination of means for fastening the body to a wall where pressure means are applied to operate the fastening means, a set of eccentric parts distributed in two groups of parts with substantially identical masses, electric motors respectively associated with the different eccentric parts and adapted for causing the two groups of parts to rotate in opposite directions in relation to one another, the different motors being firmly attached to the body and substantially lined up on the same axis, and an electronic control system at least one module of which is contained in the body and which is adapted for adjusting the rotation speed of each one of the motors as well as the angular phase shift of the eccentric parts of each of the groups, in order to generate a resulting vibrating force polarized following in a particular direction substantially perpendicular to the common axis of the motors, and the amplitude of which varies in a determined way according to the frequency.

The electronic system is adapted for controlling the rotation of the eccentric parts in order to obtain, for example, a resulting force the amplitude of which is substantially independent of the frequency.

According to an embodiment, at least one of the two groups of parts can comprise two couples rotating in the same direction.

According to another embodiment procedure, the two sets of eccentric parts comprise, for example, three couples of eccentric parts, two of the couples consisting of eccentric parts with a defined mass m rotating in the same direction, the third couple consisting of two eccentric parts the mass m' of which is double the mass m of the parts of the first two couples, the parts of the third couple rotating in the opposite direction in relation to the parts of the first two couples.

The electronic control system comprises, for example, position sensors showing the respective angular positions of the different electric motors, means for determining the resulting force and control means for correcting the deviations of the different electric motors in relation to set values depending on the determined resulting force.

A control system comprising a programmed treatment set connected with the position sensors and with said determination means, in order to control the application to the motors of signals depending on set values, is for example, used.

According to an embodiment, the electric motors are step motors and the control system comprises means for generating control pulses as well as a programmed processor to vary the number of pulses applied to the different step motors in order to obtain the defined oscillation frequency and direction.

The means for varying the number of pulses can comprise, for example, elements that distribute the control pulses to the different step motors, so that each one of them receives a series of pulses compatible with the defined oscillation frequency and direction.

An electronic system where the two electronic modules comprise, for example, signal transmission sets on the lines of a multifunction cable and interface sets for encoding and decoding the electric signals exchanged by said lines is, for example, used.

The pressure means for the vibrating source comprise, for example, a hydraulic pump arranged in the body and driven by an electric motor connected with a surface generator by conductors of the multifunction cable, and control jacks intermittently communicating with the pressure means.

The electronic piloting system comprises, for example, demultiplexing means for transmitting in sequence the signals of the pickups and of the means for determining the resulting force. The control system comprises for example, control modules controlled by the programmed processor, in order to vary the electric current applied to the electric motors according to the set values.

The vibrating source according to the invention provides numerous advantages:

with weights where each one is driven by an independant electric motor, a simple and reliable mechanical structure is obtained that can be integrated into a relatively limited space such as a wellbore;

with its electronic control system, a very sharp control of the resulting force, including intensity as well as direction, and a very regular change in the oscillation frequency can be obtained;

the closed loop regulating circuits associated with the direct-current electric motors or with the step motors may very easily include transmitting circuits of great length, which is very desirable for the remote control of the vibrating source. The vibrating source according to the invention thus lends itself particularly well to use in a well.

BRIEF DESCRIPTION OF THE DRAWINGS

Other features and advantages of the vibrating source according to the present invention will be clear from reading the description hereafter of an embodiment given by way of non-limitative example, with reference to the accompanying drawings in which:

FIG. 3 shows in a more detailed way a vibrating source such as that depicted in FIG. 2;

DESCRIPTION OF THE PREFERRED EMBODIMENTS

Figure 1:
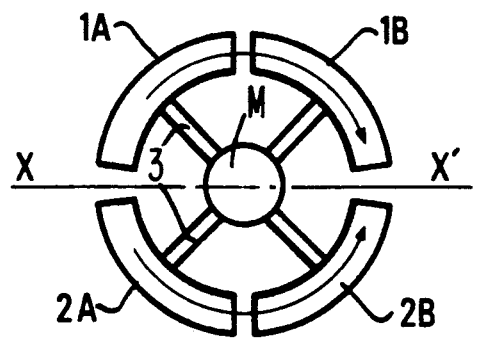
FIG. 1 is a diagram showing a set of eccentric parts allowing obtaining a vibrating force in a defined direction, the amplitude of which is substantially constant whatever the frequency may be.

The diagram of FIG. 1 shows that a polarized alternate force is obtained by rotating a set of eccentric mechanical parts. This set comprises, for example, four weights 1A, 1B, 2A, 2B, each one linked by an arm 3 to a respective shaft that is caused to rotate by a motor M. The four shafts driving the weights are distinct, but they are mechanically coupled with one another while leaving the bearings that support them interdependent. The four weights have the same mass and are combined in couples. The two weights 1A and 1B are caused to rotate in one direction, indicated by arrow A1, and the two others, 2A and 2B, are caused to rotate in the opposite direction, indicated by arrow A2. The rotating motions of the two couples are symmetrical in relation to an axis XX'. The resultant of the forces generated by the rotation of the two couples, is an oscillating force directed along the axis XX'. The intensity of the oscillating force depends on the total mass of the eccentric parts as well as on the length of arms 3, and it varies as the square of the angular rotation speed. The frequency of the oscillating force is proportional to the rotation speed of the shafts. The two eccentric parts of each couple are subjected to an angular spacing out in relation to one another, in order to make the oscillating force substantially independent of the angular speed. The angular phase shift increases as the rotation speed grows.

Figure 4:
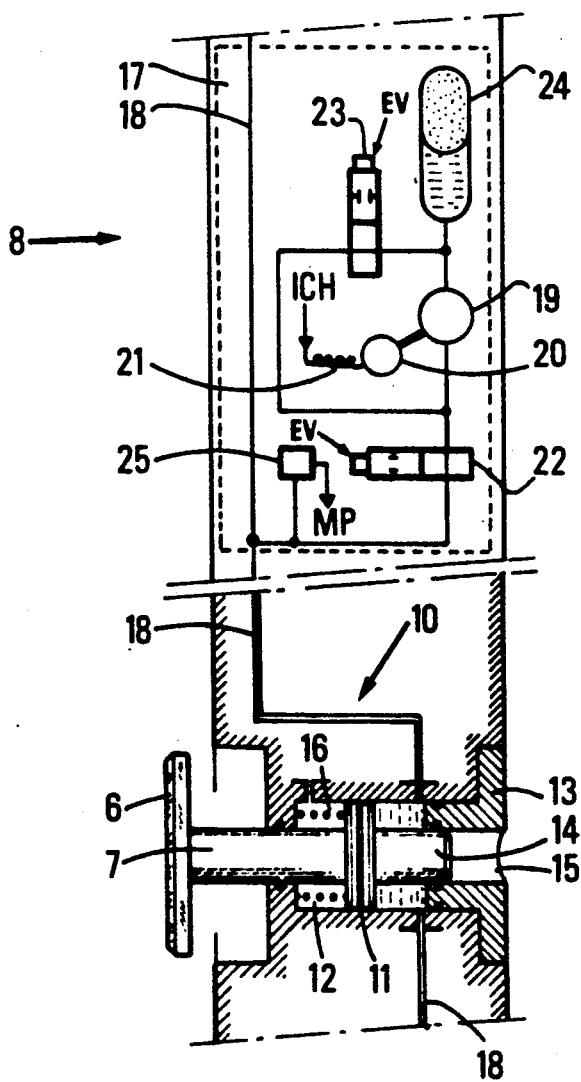
FIG. 4 shows an embodiment of a hydraulic system for controlling the jacks operating the anchor shoes.
Figure 2:
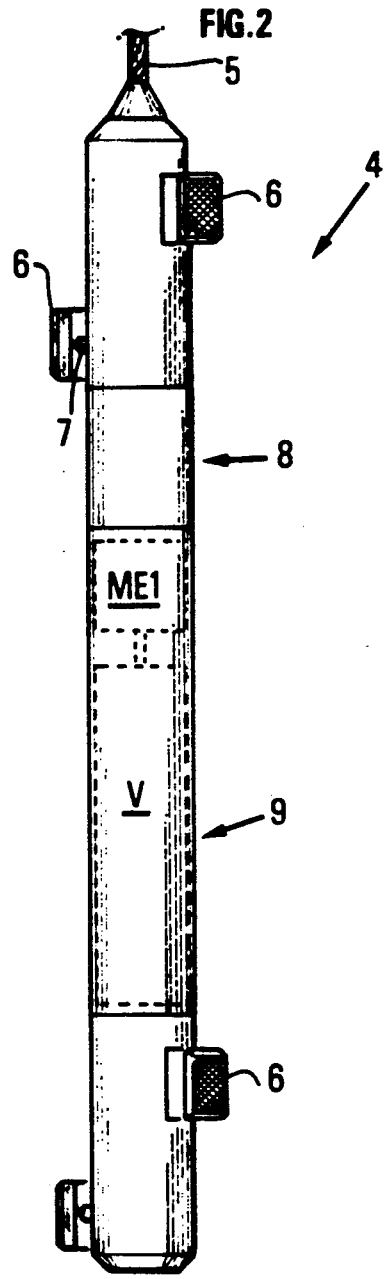
FIG. 2 shows the layout of the different parts of a source adapted for working in a relatively narrow well.

The vibrating source according to the invention works following this principle. In the application to a well source, given by way of example, the vibrating elements are included (FIGS. 2, 3) in an extended rigid body 4 that is lowered into a well at the end of an electric-carrying cable 5 comprising a multiplicity of conducting lines. The body 4 is fitted in each one of its opposite end parts with movable fastening or anchoring elements 6. These elements 6 are for example shoes that can be displaced radially between a recessed position and an advanced position where they are in contact with the walls of the well. The axes of displacement of the shoes are arranged at 120° in relation to one another, preferably with a longitudinal shift. The shoes 6 are fastened to the ends of the rods 7 of hydraulic jacks. These jacks are supplied by a hydraulic plant delivering a fluid under pressure, as will be seen in relation to FIG. 4. This plant is arranged in a compartment 8 adjacent to the central part 9 of the body 4. Central part 9 contains the vibrator V associated with its electronic control module ME1 which is shown in detail in FIGS. 3 and 4.

Figure 3:
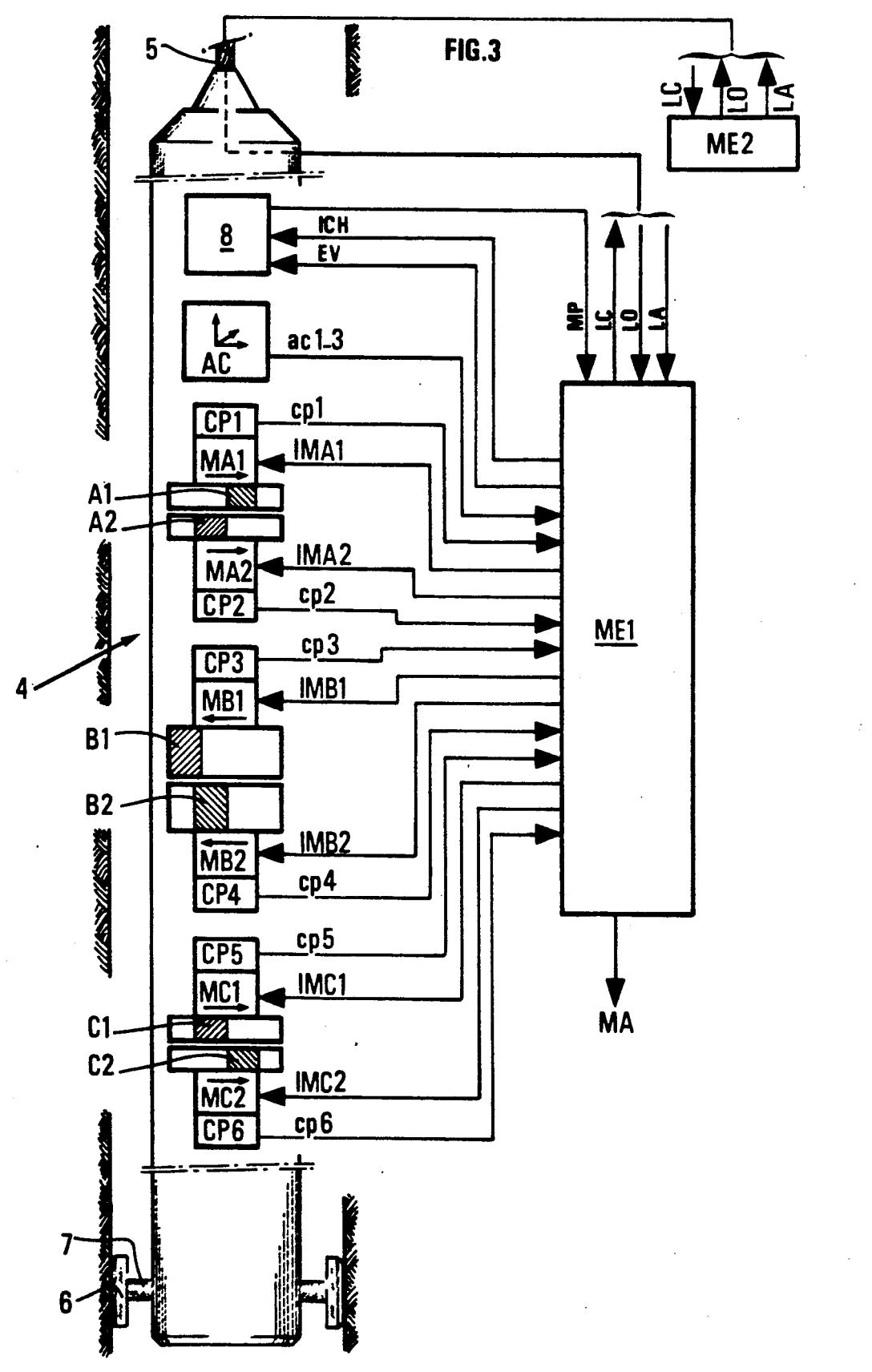

As can be seen in FIG. 3, the vibrating source comprises, for example, two sets consisting of three couples A1, A2, B1, B2 and C1, C2 of eccentric parts or weights. The six weights are respectively driven by six electric motors MA1, MA2, MB1, MB2, MC1, MC2. Parts A1, A2, C1 and C2 have a substantially identical mass m and their motors drive them all in the same rotational direction. The two weights B1 and B2 have a mass m' which is twice the mass m, and their motors MB1, MB2 drive them in the opposite direction. All the motors are run at the same speed in order to obtain two sets of weights with equivalent kinetic moments and with opposite directions, and thereby a resulting force oscillating following a defined direction. A triaxial accelerometer AC is arranged in the body of the source. It delivers three component signals ac1, ac2, ac3.

According to a first embodiment, procedure, the electric motors MA1 to MC2 are direct-current motors. They are respectively associated with six position pickups or sensors of a well-known type CP1, CP2 ... CP6 respectively producing electric signals cp1 ... cp6 indicative of the response of the associated motors to the excitation current applied to them. A first electronic module ME1 of an electronic system or treatment set also including a second module ME2 arranged outside the well and communicating with the first one through three lines LA, LO and LC included in the electric-carrying cable 5, is arranged within body 4. The first module ME1 receives the signals cp1 to cp6 generated by pickups CP1-CP6 and the signals ac1-3 generated by the accelerometer AC, and it delivers currents IMA1, IMA2, IMB1, IMB2, IMC1 and IMC2 for the respective driving of motors MA1 to MC2. Module ME1 also delivers a current ICH and a trigger signal EV for the hydraulic plant in compartment 8, as shown below in relation to FIG. 4.

The vibrations communicated to the rigid body 4 by the rotation of weights A1-C2 are transmitted to the walls of the well by the anchor shoes 6.

Each anchor shoe 6 is fastened to a rod 7 of an anchor jack 10 (FIG. 4) comprising a piston 11 firmly attached to rod 7 and tightly sliding in a chamber 12 radially arranged in the body and closed on the side of the body opposite shoe 6 by a cover 13. On the side of the piston opposite this shoe 6, rod 7 includes an extension 14 which tightly slides in an opening 15 through cover 13. This arrangement balances rod 7 which is subjected to the pressure prevailing in the well at both ends. A spring 16 is arranged in chamber 12, in order to push piston 11 towards its recessed position. The respective parts of chambers 12, on the side of the pistons 11 opposite springs 16, communicate with one another and with the hydraulic plant 17 of compartment 8 through pipes 18. This plant 17 includes a hydraulic pump 19 driven by an electric motor 20 receiving, through electric conductors 21, an excitation current ICH from module ME1. A first solenoid valve 22 communicates the outlet of pump 19 with pipes 18, when valve 22 is in an open position. The outlet of pump 19, in the open position of a second solenoid .valve 23, communicates with a hydraulic accumulator 24. Thus, according to the position of valves 22 and 23, pump 19 communicates with accumulator 24 and/or the pipes 18 feeding the jacks. A pressure pickup 25 is connected on pipe 18 and delivers a measuring signal MP to module ME1.

Through trigger signals EV coming from the electronic control module ME1 which will be described hereafter, valves 22, 23 are tripped in order to supply the different jacks 10 and to displace the shoes 6 towards their respective fastening positions in contact with the walls of the well when the body of the source has reached the depth selected for emitting vibrations.

Figure 5:
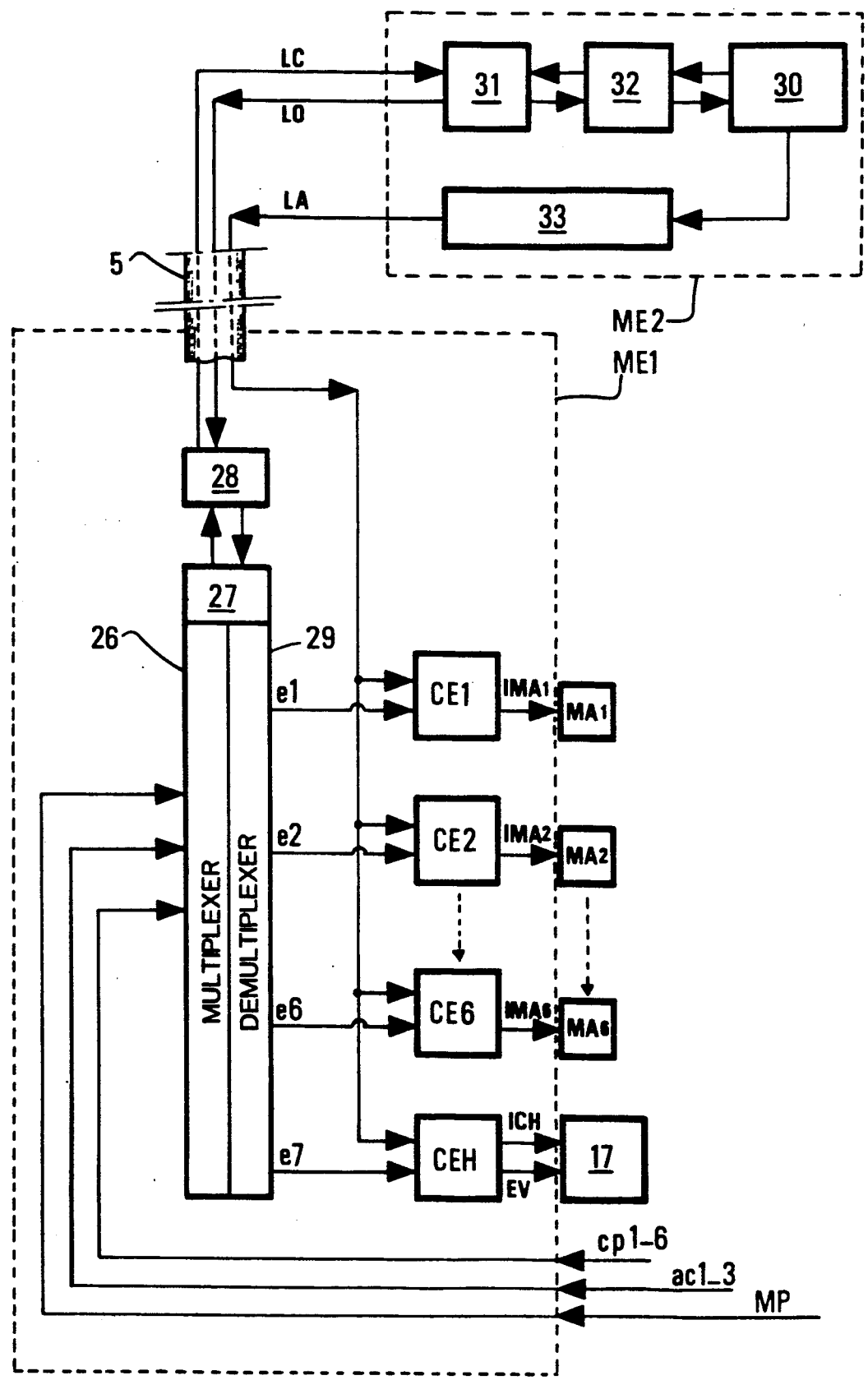
FIG. 5 is a block diagram of the electronic system for piloting the source.

The first module ME1 of the electronic control system comprises (FIG. 5) a multiplexer 26 to the inlets of which signals are applied the cp1, cp2 ... cp6 (cp1-6) generated by the position pickups associated with the motors MA1 to MC2 of the vibrator, the signals ac1, ac2, ac3 (ac1-3) generated by accelerometer AC (FIG. 3 and, the signal MP supplied by pressure gage 25 giving the pressure prevailing in the circuits for the fastening of hydraulic plant 17. The samples of signals from multiplexer 26 are applied to an interface set 27, adapted for digitizing and encoding the signal samples, and then to a line emitter (not shown) in a transmission set 28. The latter is connected with line LC of cable 5 assigned to the transmission of the measured signals towards the surface module ME2. The order signals coming from the surface module ME2 through line LO of cable 5 are received by a line receiver (not shown) in the transmission set 28 and decoded in the interface set 27, before being applied to a demultiplexer 29. Outlets e1, e2 ... e6 of the latter are connected with the inlets of six electronic control modules CE1, CE2 ... CE6 linked to the electric supply line LA of cable 5. Currents IMA1 to IMC2 supplying the different motors of vibrator V are respectively available at the outlets of control modules CE1 to CE6. An electronic switch CEH is also linked to line LA. When an order signal coming from another outlet e7 of demultiplexer 29 is received, switch CEH delivers on its outlets the current ICH driving the hydraulic pump 19 (FIG. 4) and the signals EV activating the solenoid valves 22, 23.

The second electronic module ME2 at the other end of cable 5 comprises a microprocessor 30 programmed for controlling the different motors of the vibrator in the well and the hydraulic plant 17 according to the status signals cp1-6, ac1-3 and MP received from the pickups of vibrator V. The microprocessor is connected with lines LC and LO through a transmission set 31 and an interface set 32 analogous to sets 27 and 28 at the opposite end of cable 5. The second module ME2 also comprises an electric supply set 33 that is connected with line LA.

The vibrating source according to the invention is utilized as follows:

it is lowered to a determined depth and, at an operator's request, microprocessor 30 sends through line LO a control signal EV to operate solenoid valves 22, 23 (FIG. 4) and to apply to the jacks a fluid under pressure in order to move the anchor shoes apart until they are coupled with the walls of the well;

the microprocessor 30 is then controlled to apply a pre-established program for controlling motors MA1 to MC2 corresponding to selected working parameters: direction of polarization of the resulting oscillating force, frequency of the vibrations to be generated, and possibly variation of the frequency emitted according to time, for example, in cases where a varying frequency is wanted for the seismic prospecting operations. The control program takes into account at each moment the signals from the pickups in the vibrator to adjust the supply currents of the different motors;

in order to keep the oscillating force substantially constant in frequency, the currents are adjusted, as described above in relation to FIG. 1, to vary the angular phase shift between the weights in the same pair. By thoroughly modifying the angular phase shifts, the microprocessor is also adapted for changing the direction of polarization of the resulting vibrating force.

In the described embodiment, the control of each motor is achieved by means of a closed control loop comprising lines LO and LC, the microprocessor comparing at any time the controlling signals directed towards the vibrator with their effects measured by the different pickups.

According to another embodiment, the driving of the weights can also be performed by replacing the direct-current motors MA1 to MA6 by stepper motors. Each motor receives from the microprocessor, by means of control modules CE1-CE6, sequences of control pulses the frequency of which is adapted to the rotation speed to be obtained. The variations of the angular phase shift between the weights, allowing a polarity change or adapting of the vibrating force according to the frequency, are obtained by selectively changing by a precise amount the number of pulses applied per time unit to one of the motors of each couple or else to both, as desired.

The electronic control system consists, in the described embodiment, of two modules ME1, ME2 spaced out in relation to one another and communicating by means of lines. It is obvious that, in the case of a surface source, the electronic system comprises a single module such as ME2, directly controlled by microprocessor 30 and supplied by the electric generator 33.

Using any set of eccentric parts divided in two groups of identical masses rotating in opposite directions in relation to one another would remain within the scope of the invention.

I claim:

1. A vibrating source particularly adapted for use in a well, comprising an extended body member, a multifunction cable including electrical conductors for linking the body member to a remote installation, means for anchoring the body member to an application wall, pressure means for operating the anchoring means, a set of eccentric parts divided in two groups of parts, he groups having substantially identical masses, a plurality of electric motors for rotating the parts of the first group of parts and the parts of the second group of parts in opposite directions in relation to one another, the motors being firmly attached to the body member and substantially axially aligned, and an electronic control system including at least one module contained in the body member for adjusting the rotational speed of the motors as well as angular phase shift of the eccentric parts of each of the two groups of parts in order to generate a resulting vibrational force polarized in a particular direction substantially perpendicular to the axis of the motors and having an amplitude which varies in a determined way according to frequency.

2. A vibrating source as claimed in claim 1, wherein the electronic control system includes means for controlling the rotation of the eccentric parts in order to obtain a resulting force having an amplitude substantially independent of the frequency.

3. A vibrating source as claimed in claim 1, wherein at least one of the groups of parts comprises two couples of parts rotatable in the same direction.

4. A vibrating source as claimed in claim 1, wherein the two sets of eccentric parts comprise three couples of eccentric parts, two of the couples comprising one of the two sets of parts with each of said two couples including eccentric parts having a defined total mass m and rotatable in the same direction, the third couple comprising the other of the two sets of parts and including two eccentric parts having a defined total mass m' equal to twice the mass m and rotatable in the direction opposite to the direction of rotation of the parts of the first two couples.

5. A vibrating source as claimed in claim 1, wherein at least one of the groups of parts comprises two couples of parts rotatable in the same direction.

6. A vibrating source as claimed in claim 1, 2, 3, 4, or 5, wherein the electronic control system comprises position sensors for indicating the respective angular positions of the electric motors, means for determining the resulting vibrational force, and control means responsive to the determined resulting vibrational force for correcting deviations of the electric motors in relation to set values.

7. A vibrating source as claimed in claim 6, wherein the electronic control system further comprises a processor connected to the position sensors and to the determining means to control the application to the motors of signals depending on the set values.

8. A vibrating source as claimed in claim 1, 2, 3, 4, or 5, wherein the electric motors are stepper motors and the control system comprises means for generating control pulses and a processor for varying the number of pulses applied to the stepper motors in order to obtain a defined oscillation frequency and vibrational direction.

9. A vibrating source as claimed in claim 8, wherein said control system further comprises elements for distributing control pulses to the stepper motors so that each stepper motor receives a series of pulses compatible with the defined oscillation frequency and vibrational direction.

10. A vibrating source as claimed in claim 1, 2, 3, 4, or 5, wherein the electronic control system comprises a second module distant from the at least one module and linked to the at least one module by conductors of the multifunction cable.

11. A vibrating source as claimed in claim 10, wherein the two modules comprise transmission sets for transmitting signals on conductors of the multifunction cable and interface sets for encoding and decoding the electric signals transmitted on the conductors.

12. A vibrating source as claimed in claim 10, wherein the pressure means comprise a hydraulic pump in the body member, an electric motor for driving the hydraulic pump, a generator in the second module and linked to the electric motor by conductors and control jacks intermittently communicating with the hydraulic pump.

13. A vibrating source as claimed in claim 6, wherein the electronic control system comprises multiplexing means for transmitting in sequence signals from said position sensors and from said determining means, and demultiplexing means for selectively distributing control pulses to the electric motors.

14. A vibrating source as claimed in claim 7, wherein the control system comprises control modules controlled by the processor to vary the electric current applied to the motors according to the set values.

15. A vibrating source comprising a body member including a plurality of eccentric parts, the plurality of eccentric parts including two groups of eccentric parts comprising three couples of eccentric parts, two of the couples comprising one of the two groups of parts with each of said two couples including eccentric parts having a defined total mass m, the third couple comprising the other of the two group of parts and including eccentric parts having a defined total mass m' equal to twice the mass m; means for coupling the body member to an application wall; a plurality of electric motors for rotating the parts of the first group of parts and the parts of the second group of parts in opposite directions in relation to one another, the motors being firmly attached to the body member and substantially axially aligned; and an electronic control system including at least one module contained in the body member for adjusting the rotational speed of the motors as well as angular phase shift of the eccentric parts of each of the two groups of parts on order to generate a resulting vibrational force polarized in a particular direction substantially perpendicular to the axis of the motors and having an amplitude which varies in a determined way according to frequency.

* * * * *